Nov. 14, 1950          J. H. GRAHAM          2,530,240
SLEIGH RUNNER ATTACHMENT
Filed Feb. 24, 1948          2 Sheets-Sheet 1
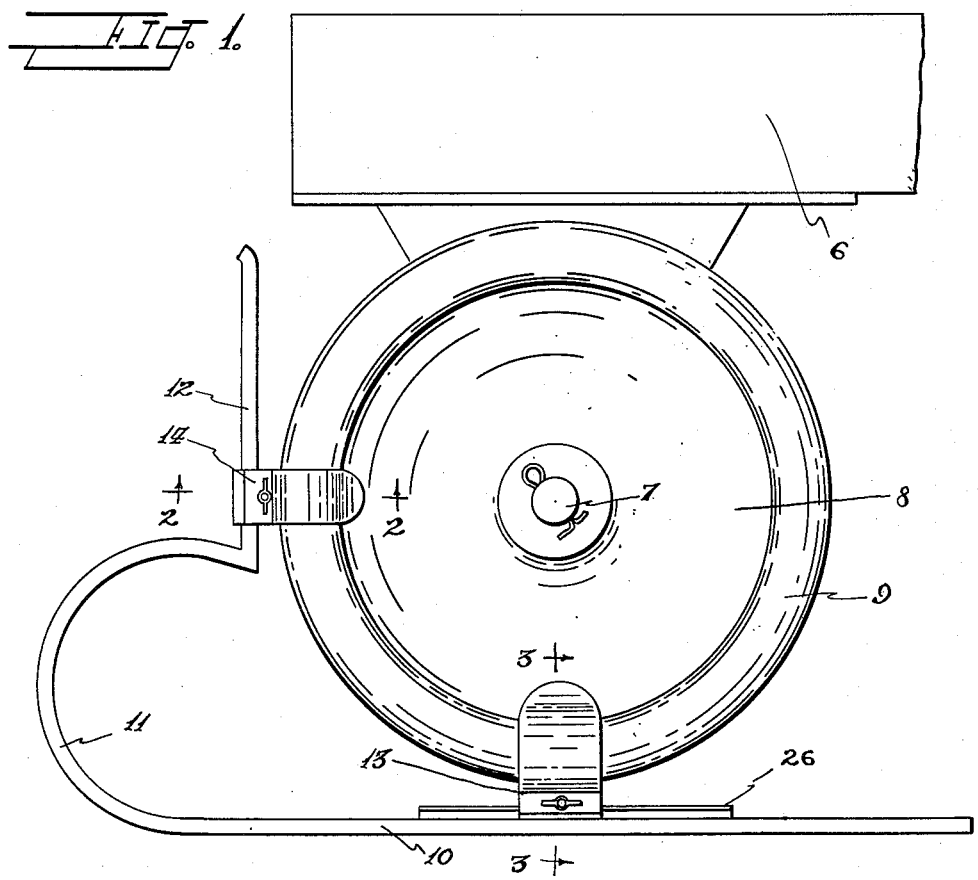
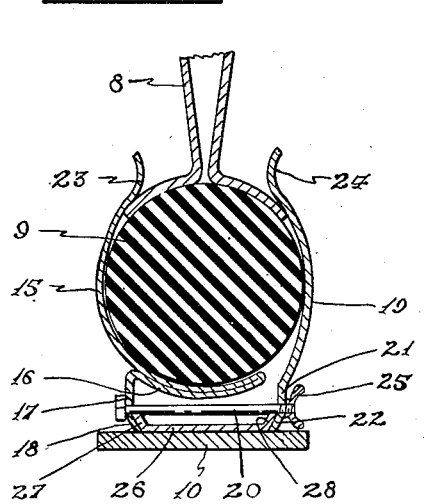
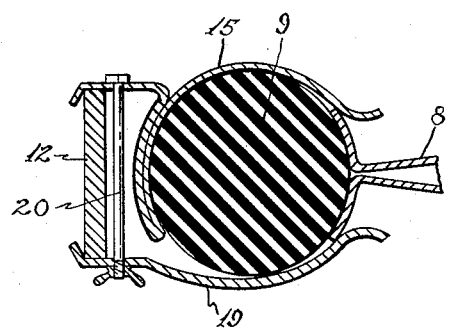
INVENTOR.
John H. Graham Nov. 14, 1950        J. H. GRAHAM        2,530,240
SLEIGH RUNNER ATTACHMENT
Filed Feb. 24, 1948        2 Sheets-Sheet 2
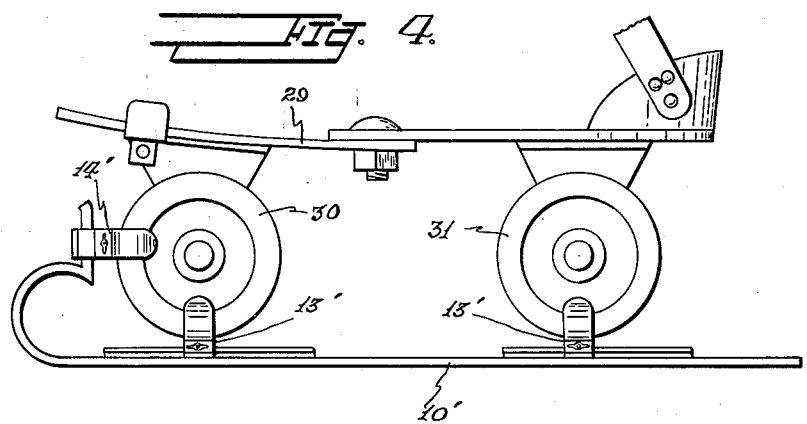
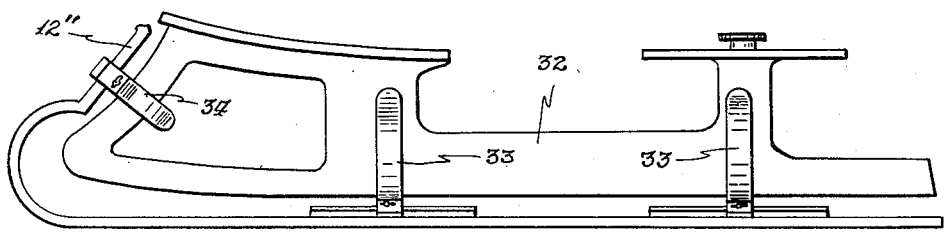
INVENTOR.
John H. Graham
BY
Smith & Wells Patented Nov. 14, 1950

2,530,240

UNITED STATES PATENT OFFICE 2,530,240

SLEIGH RUNNER ATTACHMENT

John H. Graham, Spokane, Wash.

Application February 24, 1948, Serial No. 10,253

4 Claims. (Cl. 280—13)

My invention relates to improvements in a sleigh runner attachment.

It is the principal purpose of my invention to provide a sleigh runner which can be applied to and removed from such devices as children's wagons, baby carriages, scooters and other vehicles, and in smaller sizes applied to skates, either roller or ice skates, to enable the user to change the vehicle from a wheeled vehicle into a sleigh or runner type of vehicle. In many sections of the country there are occasional periods during the winter when sufficient snow is present for a while to make it desirable to use a sleigh or runner supported vehicle instead of a wheeled vehicle.

Such vehicles as children's wagons and baby carriages are particularly difficult to handle when there is snow on the sidewalks and streets because the snow is seldom packed evenly and the wheels must pass over ridges and into ruts. My invention contemplates the provision of runner attachments for the wheels which can be quickly applied or removed so that it is a simple matter to transform the wheeled vehicle into a bob sled having four runners.

It is also a purpose of my invention to provide a runner attachment of the character described which is readily adapted in a single size to wheels of a wide range in diameter so that, for example, one set of runners may be used upon a baby carriage when desired and also applied to a child's wagon when not used on the carriage. In this way the advantages of a runner type of vehicle can be had during those periods when snow is on the ground without the necessity of purchasing and keeping complete sleighs.

The nature and advantages of my invention will appear more fully from the following description and the accompanying drawings wherein a preferred form of the invention is shown. It should be understood however, that the drawings and description are illustrative only and are not to be considered as limiting the invention except insofar as it is limited by the claims.

In the drawings:

Figure 1 is a view in side elevation of a vehicle wheel to which my runner attachment has been applied;

Figure 2 is a sectional view taken substantially on the line 2—2 of Figure 1;

Figure 3 is a sectional view taken on the line 3—3 of Figure 1;

Figure 4 is a side view of a roller skate showing the improved runner attachment applied thereto; and Figure 5 is a side view of an ice skate showing the attachment applied thereto.

Referring now to the drawings, and particularly to Figures 1, 2 and 3, my invention is embodied in a sleigh runner attachment which can be fitted to the supporting wheels or blade of such articles as baby carriages, children's wagons and skates, as well as various other wheeled vehicles like scooters, tricycles and the like. The attachment comprises a runner, having a substantially straight rigid load bearing portion 10 which is adapted to engage the surface and support the vehicle wheel. The runner has a nose portion 11 at the front end of the portion 10 which portion is curved upwardly and then rearwardly to form a partial loop so that the free end of the nose portion is extended over the front part of the load bearing portion 10. An upright extension 12 is formed at the free end of the nose portion. The entire runner just described, may desirably be made in one piece and of sufficient thickness and width to withstand the strain to which a sleigh runner supporting a similar weight would be subjected. The upright portion 12 may or may not be narrower than the runner portions 10 and 11.

Means are provided for attaching the runner to the wheel of a vehicle in such a way that the runner can be quickly applied and removed. This means comprises two wheel receiving clamps 13 and 14 for each runner, the clamps being substantially identical. Each clamp comprises a clamping jaw 15 preferably of spring metal. The jaw 15 is formed with a base 16 folded upon itself to provide a tire receiving cradle or seat. The material of the jaw 15 is then extended downwardly as shown at 17 and formed with an inturned lip 18. An opposite clamping jaw 19 is connected to the jaw 15 by a bolt 20. The jaw 19 has a portion 21 corresponding to the portion 17 of the jaw 15 and has an inturned lip 22 like the lip 18. The two jaws 15 and 19 are curved inwardly adjacent their upper ends and terminate in rounded portions 23 and 24. A wing nut 25 is provided for the bolt 20 to draw the two jaws 15 and 19 together.

In order that the clamping device 13 may be applied to the load bearing portion 10 of the runner without extending out beyond the side edges of the runner, and in such a fashion to be adjustable lengthwise of the runner, I secure a mounting strip 26 on top of the portion 10 of the runner. This mounting strip has side flanges 27 and 28 for cooperation with the flanges 18 and 22 of the clamping jaws 15 and 19. It is believed to be evident that the clamp 13 may be applied to a tire edge on the wheel 8 of the vehicle shown in Figure 1 so that the load of the vehicle will be carried by the clamp and in turn transmitted to the runner portion 10. The wheel axle is indicated at 7 and a portion of a vehicle body is indicated at 6.

The clamp 14 preferably is identical to the clamp 13, and the same reference numerals have been applied to the part thereof illustrated in section in Figure 2 of the drawings. This clamp however, is applied to the upright portion 12 of the runner so the strip 26 is not needed. It is desirable to have the portion 12 somewhat narrower than the runner portion 10 in order that the clamp 14 will more readily engage the tire 9.

It is believed to be evident that for different sizes of wheels, the clamps 13 and 14 can be adjusted lengthwise along their respective runner portions 10 and 12 to accommodate the change in diameter of the wheel. Thus the same runner may fit wheels from six inches in diameter to twelve inches in diameter provided the proper length for the strip 26 and the upright 12 is established. It would rarely be the case that such a wide range of wheel diameter would have to be covered with one set of runners. It is contemplated that the most desirable form of runner for children's use on their wagons would likely be one for each wheel so that the wagon would become a bob sled. However it is entirely possible, as shown by Figure 4 of the drawings, to have a single runner with more than one clamp 13 on the straight portion of the runner so that a front and rear wheel will be supported by the same runner. In all instances the runner is attached to the wheel along a horizontal portion of the wheel, and the nose of the runner is attached along a vertical line at the front edge of the wheel. This provides adequate attachment and strength to prevent the runners from slipping off the wheels in use. The large loop provided at the front end of the runners to form the nose of the runner insures adequate spacing of the front end of the runner from the load center. The structures shown in Figures 4 and 5 are essentially the same as in Figures 1, 2 and 3. In Figure 4 however, the vehicle or device to be supported on the runner is shown as a roller skate 29. The load bearing portion 10' of the runner has two clamps 13', one for the front wheel 30 and the other for the rear wheel 31 of the skate. The clamps 14' function in the same manner as the clamp 14.

In Figure 5 an ice skate 32 is shown with the runner attached thereto by a pair of clamps 33 engaging the blade of the skate and a clamp 34 engaging the front end of the skate. In this case the upwardly extending portion 12'' of the runner does not extend vertically. Otherwise the construction is essentially the same as in Figure 4. The jaws of the clamp 33 and 34 must of course close almost together in order to grip the blade of the skate.

Having thus described my invention, I claim:

1. A sleigh runner adapted for attachment to wheeled vehicles such as children's wagons, baby carriages and the like, comprising a runner bar having a substantially straight load bearing portion, a nose portion curved upwardly and rearwardly over the load bearing portion, and an upwardly extending straight portion at the upper rear end of the nose portion said upwardly extending straight portion being at substantially right angles to the load bearing portion, to provide an adjustable mounting means for a vertically sliding clamp, a wheel receiving clamp adjustably mounted on the load bearing portion having clamp portions for detachably receiving the tire of a vehicle wheel therebetween, and a second wheel receiving vertically adjustable clamp on the upwardly extending portion having clamp portions for detachably receiving the tire of a vehicle wheel therebetween.

2. A sleigh runner adapted for attachment to wheeled vehicles such as children's wagons, baby carriages and the like, comprising a runner bar having a substantially straight load bearing portion, a nose portion curved upwardly and rearwardly over the load bearing portion, and an upwardly extending straight portion at the upper rear end of the nose portion said upwardly extending straight portion being at substantially right angles to the load bearing portion, to provide an adjustable mounting means for a vertically sliding clamp, a wheel receiving clamp adjustably mounted on the load bearing portion having clamp portions for detachably receiving the tire of a vehicle wheel therebetween, and a second wheel receiving vertically adjustable clamp on the upwardly extending portion having clamp portions for detachably receiving the tire of a vehicle wheel therebetween, said load bearing portion having a flanged clamp mounting strip on its top surface on which the first named clamp is longitudinally adjustable.

3. A sleigh runner adapted for attachment to wheeled vehicles such as children's wagons, baby carriages and the like, comprising a runner bar having a substantially straight load bearing portion, a nose portion curved upwardly and rearwardly over the load bearing portion, and an upwardly extending straight portion at the upper rear end of the nose portion said upwardly extending straight portion being at substantially right angles to the load bearing portion, to provide an adjustable mounting means for a vertically sliding clamp, a wheel receiving clamp adjustably mounted on the load bearing portion having clamp portions for detachably receiving the tire of a vehicle wheel therebetween, and a second wheel receiving clamp, adjustable vertically, on the upwardly extending portion having clamp portions for detachably receiving the tire of a vehicle wheel therebetween.

4. A sleigh runner adapted for attachment to wheeled vehicles such as children's wagons, baby carriages and the like, comprising a runner bar having a substantially straight load bearing portion, a nose portion curved upwardly and rearwardly over the load bearing portion, and an upwardly extending straight portion at the upper rear end of the nose portion said upwardly extending straight portion being at substantially right angles to the load bearing portion, a wheel receiving clamp on the load bearing portion having clamp portions for detachably receiving the tire of a vehicle wheel therebetween one of which clamp portion includes a curved seat on which the tire of the vehicle is supported, and a second wheel receiving clamp, adjustable vertically, on the upwardly extending portion having clamp portions for detachably receiving the tire of a vehicle wheel therebetween, said load bearing portion having a clamp mounting strip on its top surface on which the first named clamp is longitudinally adjustable.

JOHN H. GRAHAM.

REFERENCES CITED

The following references are of record in the file of this patent:

UNITED STATES PATENTS

| Number | Name | Date |
| --- | --- | --- |
| 970,874 | Beffel | Sept. 20, 1910 |
| 988,679 | Wagner | Apr. 4, 1911 |
| 1,076,816 | Carlson | Oct. 28, 1913 |
| 2,081,024 | Turner | May 18, 1937 |